(12) United States Patent
Akil Ponnuswamy et al.

(10) Patent No.: US 8,352,603 B2
(45) Date of Patent: Jan. 8, 2013

(54) LIMITING RESOURCES CONSUMED BY REJECTED SUBSCRIBER END STATIONS

(75) Inventors: Namadurai Akil Ponnuswamy, Sunnyvale, CA (US); Sudhagar Chinnaswamy, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 332 days.

(21) Appl. No.: 12/854,084

(22) Filed: Aug. 10, 2010

(65) Prior Publication Data

US 2012/0042071 A1 Feb. 16, 2012

(51) Int. Cl.
  G06F 15/173 (2006.01)
  G06F 9/00 (2006.01)
  G06F 11/00 (2006.01)
  G06F 7/04 (2006.01)
  H04L 29/06 (2006.01)
(52) U.S. Cl. ............. 709/225; 726/14; 726/22; 726/31; 713/163; 713/170; 707/927
(58) Field of Classification Search .................... 726/14, 726/22, 31; 709/225; 713/163, 170
See application file for complete search history.

(56) References Cited

U.S. PATENT DOCUMENTS

| | | | | |
|---|---|---|---|---|
| 7,010,727 | B1 * | 3/2006 | Stucker | 714/52 |
| 8,036,636 | B1 * | 10/2011 | Rieschick et al. | 455/406 |
| 2004/0064741 | A1 * | 4/2004 | Haverinen et al. | 713/202 |
| 2005/0177865 | A1 * | 8/2005 | Ng et al. | 726/3 |
| 2005/0243717 | A1 * | 11/2005 | Stieglitz et al. | 370/229 |
| 2008/0220740 | A1 * | 9/2008 | Shatzkamer et al. | 455/411 |
| 2010/0050255 | A1 * | 2/2010 | Upadhyay et al. | 726/22 |
| 2010/0103818 | A1 * | 4/2010 | Griffith et al. | 370/235 |
| 2010/0257589 | A1 * | 10/2010 | Zhao | 726/3 |
| 2010/0274893 | A1 * | 10/2010 | Abdelal et al. | 709/224 |
| 2012/0005727 | A1 * | 1/2012 | Lee et al. | 726/3 |

OTHER PUBLICATIONS

"Cisco Nexus 7000 Series NX-OS Security Configuration Guide, Release 4.1", Apr. 27, 2009, Retrieved from the Internet: URL:http://www.cisco.com/en/US/docs/switches/datacenterlsw/4_1/nx-os/security/configuration/guide/sec_nx-os.pdf [retrieved on Sep. 21, 2011].
N. Brownlee et al., Accounting Attributes and Record Formats, Network Working Group, Request for Comments: 2924, Sep. 2000, 36 pages.
P. Calhoun et al., Diameter Base Protocol, Network Working Group, Request for Comments: 3588, Sep. 2003, 147 pages.
C. Rigney et al., Remote Authentication Dial in User Service (RADIUS), Network Working Group, Request for Comments: 2865, Jun. 2000, 76 pages.

* cited by examiner

*Primary Examiner* — Joseph Avellino
*Assistant Examiner* — Aftab Nasir Khan
(74) *Attorney, Agent, or Firm* — Blakely Sokoloff Taylor & Zafman, LLP

(57) ABSTRACT

A method performed in a network element coupled between a subscriber end station and an AAA server for avoiding AAA processing by at least temporarily suppressing AAA access-request messages for a rejected subscriber end station. The network element receives subscriber session-request messages from the subscriber end station. Subscriber session-request messages include information for verifying an identity that the network element transmits to the AAA server as AAA access-request messages. The network element receives AAA access-response messages corresponding to the AAA access-request messages. Responsive to an AAA access-response message, the network element determines that additional AAA access-request messages should be, at least temporarily, suppressed with regards to the subscriber end station. Responsive to determining, the network element suppresses any additional AAA access-request messages from being transmitted to the AAA server. The suppression of AAA access-request messages conserves execution resources in the network element and the AAA server.

15 Claims, 8 Drawing Sheets

LIMITING RESOURCES CONSUMED BY REJECTED SUBSCRIBER END STATIONS

FIELD OF THE INVENTION

Embodiments of the invention relate generally to the field of networking; and more particularly, to limiting the resources consumed by rejected subscriber end stations during network processing.

BACKGROUND

In the field of consumer telecommunications, network access providers offer network access as a subscription based service to subscribers across a variety of communication mediums and through a variety of communication protocols. Many network access providers employ edge network elements between the Internet and subscriber end stations. As subscriber end stations are involved in communications with the network, the edge network elements forward network traffic from the subscriber end station to the Internet and vice-versa.

For example, in the case of DSL service, a subscriber end station may utilize a DSL modem coupled over telephone lines to a Digital Subscriber Line Access Multiplexer (DSLAM). The DSLAM may be further coupled to an edge network element via a variety of Wide Area Network (WAN) services, such as ATM or ETHERNET protocol over T1, T3, OC3, OC12, OC48, or OC128. As often is the case, a service provider may implement security measures to ensure that a subscriber end station is authorized to make use of the network. These security measures may authenticate the identity of a subscriber end station and the corresponding subscriber, authorize the subscriber end station to use certain end station information resources, and account for the subscriber end stations' usage of network resources; collectively, these security measures are respectively referred to as Authentication, Authorization, and Accounting (AAA).

Each time a subscriber end station is not authenticated through the service provider's security measures, then the subscriber end station may attempt to authenticate again. In many cases, an edge network element must forward the authentication request along to an AAA server that provides the security measures as part of a client/server system to the edge network element.

FIG. 1 (prior art) illustrates a data flow diagram of subscriber end station session requests and AAA access-request messages along with the corresponding response messages. Along the top of FIG. 1 a subscriber end station 'A' 100, a network element 105, and an AAA server 110 are each illustrated with a vertical line indicating the progression of time. The transmission of various requests and responses are illustrated chronologically down as horizontal arrows between the vertical lines.

In FIG. 1, the subscriber end station 'A' 100 is attempting to initiate a session with the network element 105. In order to fully initiate a session the network element 105 must verify information with the AAA server 110. It is well understood that a plurality of subscriber end stations may be coupled to the network element 105 and the designation of subscriber end station 'A' is used to focus on an exemplary subscriber end station.

In FIG. 1, the subscriber end station 'A' 100 transmits a subscriber end station 'A' session-request message 120A to a network element 105. In response to the session-request message 120A, the network element 105 transmits an AAA access-request message 130A to an AAA server 110. Responsive to the AAA access-request message 130A, the AAA server transmits an AAA access-reject message 135A to the network element 105. The network element 105 transmits a subscriber end station 'A' session-reject message 125A to the subscriber end station 'A' 100 responsive to the AAA access-reject message 135A. In at least some cases, the subscriber end station 'A' 100 will attempt another subscriber 'A' session-request message 120B-120N to network element 105 after each session-reject messages 125A-125N. In the prior art, the network element 105 transmits an AAA access-request message 130A-130N in response to each subscriber end station 'A' session-request message 120A-120N. In turn, the AAA server 110 transmits an AAA access-reject message 135A-135N in response to each AAA access-request message 130A-130N, and the network element 105 transmits a subscriber end station 'A' session-reject message 125A-125N in response to each AAA access-reject message 135A-135N.

SUMMARY OF THE INVENTION

Embodiments of the invention include a method performed in a network element coupled between a subscriber end station and an AAA server for avoiding AAA processing by suppressing additional AAA access-request messages for a rejected subscriber end station. The network element receives one or more subscriber session-request messages from the subscriber end station. Each subscriber session-request message includes information for verifying an identity that the network element transmits to the AAA server as an AAA access-request message. The network element receives an AAA access-response message from the AAA server corresponding to the AAA access-request message. Responsive to the AAA access-response message, the network element determines that additional AAA access-request messages should be at least temporarily suppressed with regards to the subscriber end station. Responsive to determining that additional access-request messages should be suppressed, the network element suppresses any additional AAA access-request messages from being transmitted to the AAA server. The suppression of AAA access-request messages preserves execution resources in the network element and the AAA server.

Embodiments of the invention include a network element that is to be coupled between a plurality of subscriber end stations and an AAA server to avoid AAA processing. The network element comprises a set of one or more ports to be coupled to the plurality of subscriber end stations, an AAA communication module to be coupled to the AAA server, and a suppression module coupled to the AAA communication module. The AAA communication module is configured to receive subscribe session-request messages sent from the plurality of subscriber end stations. The AAA communication is further configured to transmit AAA access-request messages to the AAA server and receive corresponding AAA access-response message of different types. At least one type of AAA access-response message is an AAA access-reject message. The suppression module comprises a determination module configured to determine when to activate a suppression of AAA access-request messages associated with any one of the plurality of subscriber end stations. The suppression module further comprises a trigger module, coupled to the determination module, configured to cause the suppressions of AAA access-request messages when the suppressions are activated. The suppression of AAA access-request messages preserves execution resources in the network element and the AAA server.

Embodiments of the invention include a method performed in an AAA server, coupled to a subscriber end station and an edge network element, for avoiding AAA processing in the AAA server and in the edge network element. The AAA server receives an AAA access-request message from the edge network element that includes information for verifying identity. The AAA server accesses a subscriber record corresponding to the subscriber end station based on the information for verifying identity. The subscriber record includes information regarding a subscriber's account associated with the subscriber end station. The AAA server transmits an AAA access-reject message in response to the AAA access-request message. The AAA access-reject message includes a status based on the subscriber's account that suggests at least a temporary suppression of any additional AAA access-request messages associated with the subscriber end station. The suppression of AAA access-request messages preserves execution resources in the network element and the AAA server.

Embodiments of the invention include an AAA server, to be coupled to an edge network element, for avoiding AAA processing in the AAA server and in the edge network element. The edge network element is also coupled to a plurality of subscriber end stations. The AAA server comprises a communication module configured to receive AAA access-request messages from the edge network element for different ones of the plurality of subscriber end stations. The communication module is further configured to transmit corresponding AAA access-response messages to the edge network element. The AAA server further comprises a subscriber record management module that is coupled to the communication module. The subscriber record management module is configured to store a plurality of subscriber records. The subscriber record management module is further configured to, responsive to each AAA access-request message, access a subscriber record that includes information relating to a corresponding subscriber. The AAA server further comprises an AAA access-response generation module that is coupled to the subscriber record management module and to the communication module. The AAA access-response generation module is configured to generate AAA access-response messages, at least one of which is an AAA access-reject message based on the currently accessed subscriber record. The AAA access-reject message indicates an at least temporary suppression of any additional AAA access-request messages associated with that subscriber record. The suppression of AAA access-request messages preserves execution resources in the network element and the AAA server.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The invention may best be understood by referring to the following description and accompanying drawings that are used to illustrate embodiments of the invention. In the drawings.

DETAILED DESCRIPTION

Figure 1:
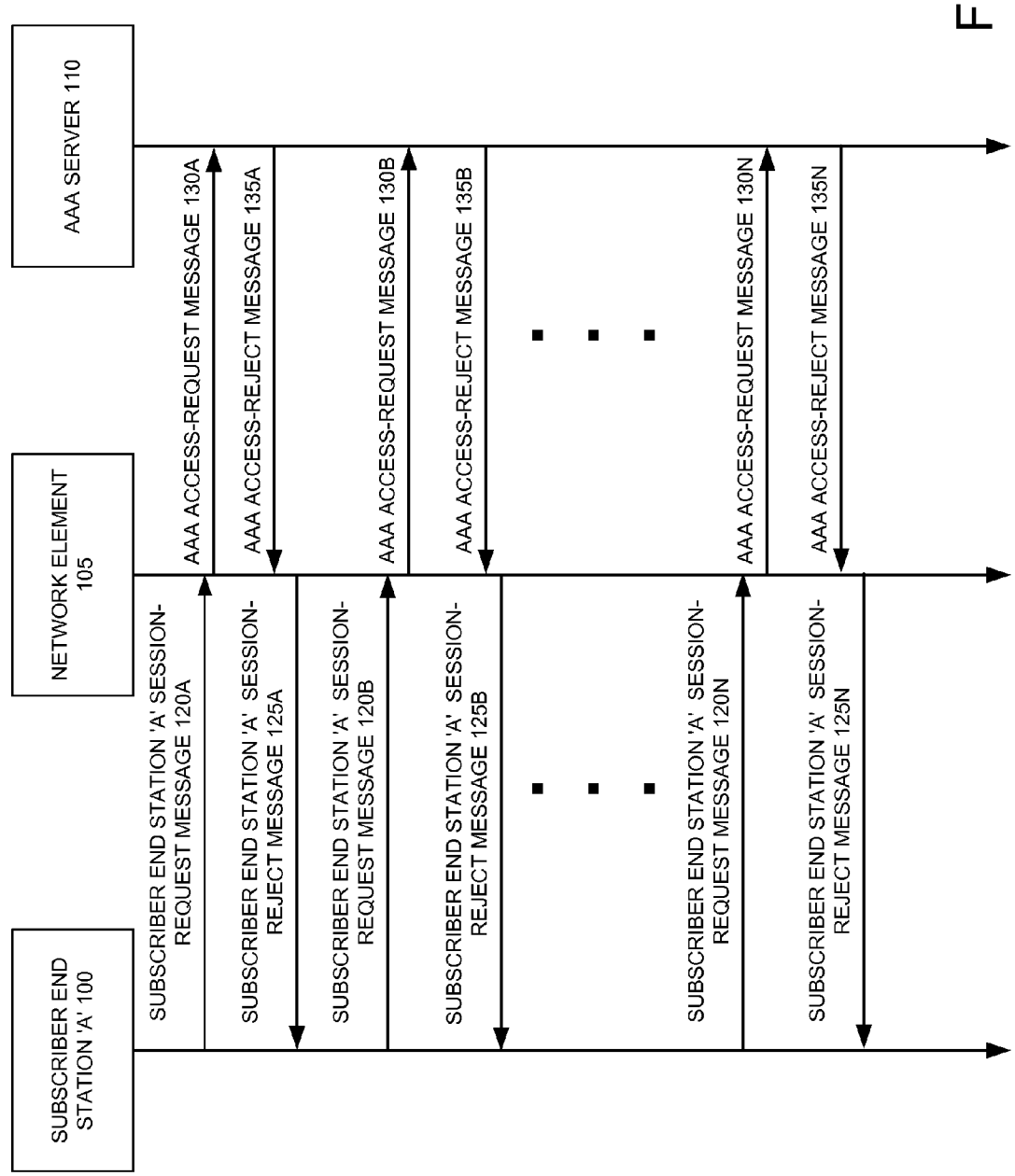
FIG. 1 (prior art) illustrates a data flow diagram of subscriber end station session requests and AAA access-request messages along with the corresponding response messages.

The following description describes methods and apparatus for avoiding AAA processing for rejected subscriber end stations. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Some network elements include functionality for AAA (authentication, authorization, and accounting) protocols (e.g., RADIUS (Remote Authentication Dial-In User Service), Diameter, and/or TACACS+ (Terminal Access Controller Access Control System). AAA can be provided through a client/server model, where the AAA client is implemented on a network element and the AAA server can be implemented either locally on the network element or on a remote end station (e.g., server end station) coupled with the network element. Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. By way of a summary example, subscriber end stations may be coupled (e.g., through an access network) through an edge network element (supporting AAA processing) coupled to core network elements coupled to server end stations of service/content providers. AAA processing is performed to identify the subscriber record for a subscriber. A subscriber record includes a set of attributes (e.g., subscriber name, password, authentication information, access control information, rate-limiting information, policing information) used during processing of that subscriber's traffic.

Figure 2:
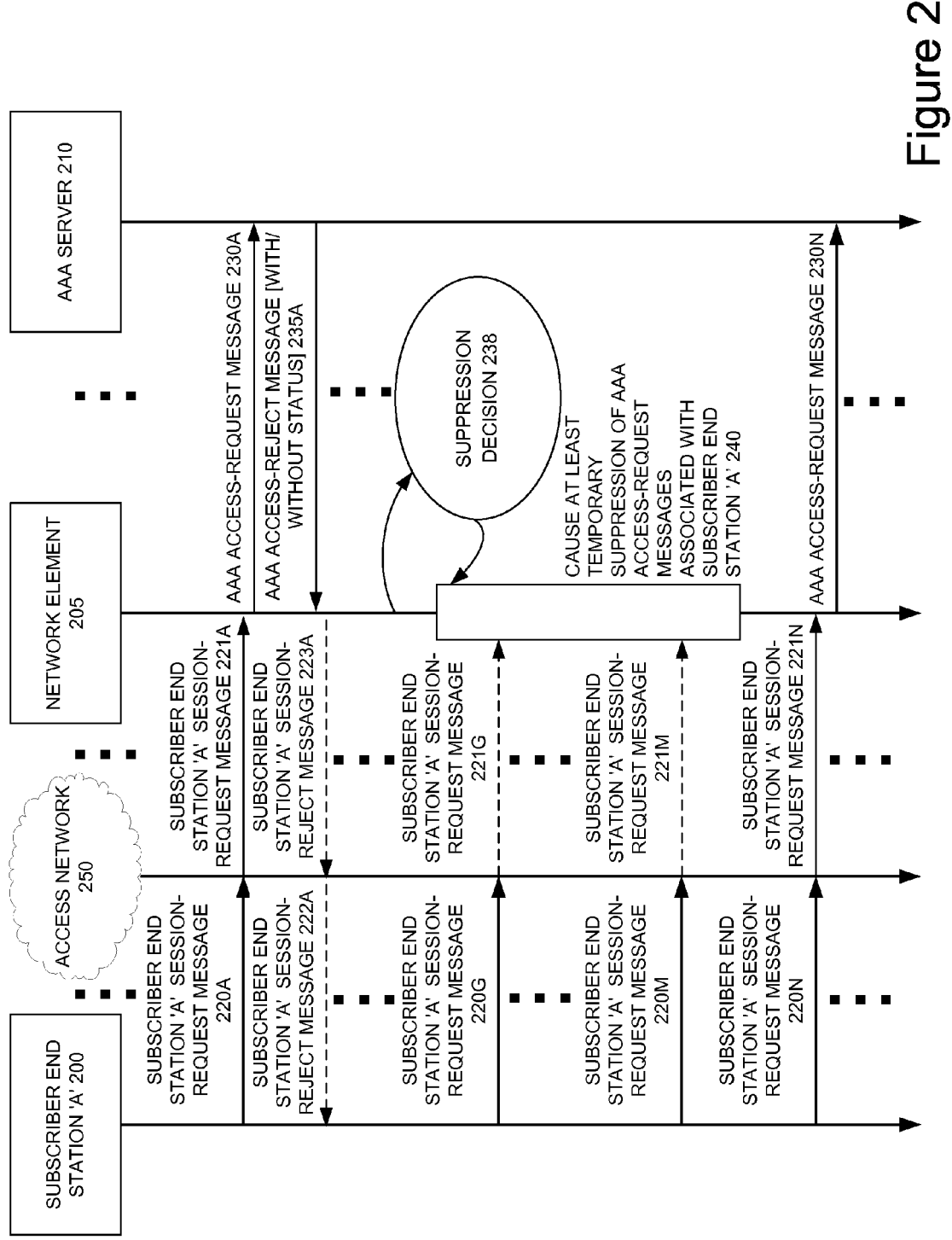
FIG. 2 illustrates a data flow diagram showing an overview of at least temporarily suppressing additional AAA access-request messages for rejected subscriber end stations according to embodiments of the invention.

FIG. 2 is a dataflow diagram illustrating an overview of at least temporarily suppressing additional AAA access-request messages for rejected subscriber end stations according to embodiments of the invention. Along the top of FIG. 2 a subscriber end station 'A' 200, an access network 250, a network element 205, and an AAA server 210 are each illustrated with a vertical line indicating the progression of time. The transmissions of various messages are illustrated chronologically down as horizontal arrows between the vertical lines, and messages that are optional based upon the specific implementation are shown with dashed arrows.

In FIG. 2, the subscriber end station 'A' 200 is coupled through the access network 250 to the network element 205. At times, the subscriber end station 'A' 200 may attempt to initiate a session with network element 205. The access network, for example, may include a DSLAM and/or cable modem termination system coupled to a variety of Wide Area Network (WAN) services, such as T1, T3, OC3, OC12, OC48, and OC128 using ATM or ETHERNET protocols. In one embodiment of the invention the network element 205 is an edge network element including functionality (e.g., an AAA client) for one or more AAA (authentication, authorization, and accounting) protocols.

To facilitate the initiation of the sessions, the subscriber end station 'A' 200 transmits a subscriber end station 'A' session-request message 220A toward the network element 205. This message is sent through the access network 250 and is received by the network element 205 as subscriber end station 'A' session-request message 221A. For example, the subscriber end station 'A' session-request message 220A maybe be received by a DSLAM (not shown) and forwarded as subscriber end station 'A' session-request message 221A to the network element 205. In response to the subscriber end station 'A' session-request message 221A, the network element 205 will transmit an AAA access-request message 230A to the AAA server 210. The AAA access-request message 230A includes an authentication request.

In at least some cases, the AAA server 210 will reject the authentication of the AAA access-request message 230A. The AAA server 210 may reject the access-request for any of a number of reasons. For instance, it may be that the identification information contained in the AAA access-request message 230A is somehow invalid or deficient, such as an incorrect username/password combination or an invalid key. In other cases, it may be that the identification information is correct but there is some other reason why the subscriber end station 'A' 200 is not authenticated. For instance, it could be that the subscriber associated with subscriber end station 'A' 200 has had network access revoked. Reasons for the revocation of network access could include, but are not limited to, insufficient payment, violation of acceptable use policies, and compromised subscriber end stations.

The AAA server 210 transmits an AAA access-reject message 235A to the network element 205 responsive to the AAA access-request message 230A. While in some embodiments of the invention the AAA access-reject message 235A will contain status information indicating that additional AAA access-request messages associated with the subscriber end station 'A' should be suppressed, alternative embodiments may not have such information included.

Some implementations of the AAA security measures may comply with the RADIUS protocol described in Request for Comments (RFC) 2865, "Remote Authentication Dial In User Service (RADIUS)", June 2000; while others may comply with RFC 3588, "Diameter Base Protocol", September 2003.

In one embodiment, the AAA access-reject message 235A conforms to the standard RADIUS protocol as described in RFC 2865. The RADIUS protocol allows that each AAA message include a generic field that may be specialized for configurable purposes set forth by a designer of the network element 205 or AAA server 210. This generic field is called a Vendor-Specific Attribute (VSA). In this embodiment, the AAA access-reject message 235A includes a VSA and the status information indicating that additional AAA access-request messages should be suppressed is included in the VSA. Another embodiment, which complies with the Diameter protocol in RFC 3588, may use an attribute-value pair AVP to transmit the status information.

In some embodiments, the network element 205 transmits a subscriber end station 'A' session reject message 223A toward the subscriber end station 'A' 200 through the access network 250, and this message is passed on to the subscriber end station 'A' as subscriber end station session-reject message 222A. However, in other embodiments, the subscriber end station 'A' session reject messages 223A and 222A are not transmitted to the access network 250 or the subscriber end station 'A' 200. The subscriber end station 'A' session reject messages 223A and 222A are shown as dashed lines traveling from the network element 205 to the access network 250 and the access network 250 to the subscriber end station 'A' 200.

Responsive to receiving the AAA access-reject message 235A, either with a status or without a status, the network element 205 will make a suppression decision 238; that is, it will determine whether there should be a suppression of AAA access-request messages associated with the subscriber end station 'A'. The suppression decision 238 is illustrated as an oval associated with the network element 205 by a curved arrowed line going from the vertical line of the network element 205 to the suppression decision 238 and a second curved arrowed line going from the suppression decision 238 back to the vertical line of network element 205. Various embodiments of the suppression decision 238 are contemplated and some of these embodiments will be described with reference to FIGS. 3A and 3B.

In cases where it is determined that the suppression should occur, the network element 205 will cause a suppression of AAA access-reject messages associated with subscriber end station 'A'. The suppression may occur in various manners and multiple embodiments are contemplated.

As represented by a vertical rectangle extending down from the suppression decision 238 along the vertical line extending down from the network element 205, the network element 205 causes a temporary suppression 240 of any additional AAA access-request messages to the AAA server 210 responsive to additional subscriber end station 'A' session-request messages 220G-220M. While the suppression 240 is active, the network element 205 will not transmit any additional AAA access-request messages to the AAA server 210 responsive to additional subscriber end station 'A' session-request messages 220G-220M. In some embodiments, any additional subscriber end station 'A' session-request messages 220G-220M are blocked within the access network 250, and thus the network element will not receive the additional subscriber end station 'A' session-request messages 221G-221M (hence, the additional subscriber end station 'A' session-request messages 221G-221M are shown with dashed lines extending from the access network 250 to the network element 205). In other embodiments, any additional subscriber end station 'A' session-request messages 220G-220M pass through the access network 250 and are received by the network element 205 as subscriber end station 'A' session-request messages 221G-221M. Embodiments of the suppression manner 240 are described with reference to FIGS. 4A and 4B.

Upon the termination of the suppression 240, the network element 205 will process a subscriber end station 'A' session-request message 221N in the same manner which the network element 205 processed the subscriber end station 'A' session-request message 221A. While exemplary embodiments of the suppression decision 238 and the temporary suppression manner 240 are described later here with reference to FIGS. 3A-3B and FIGS. 4A-4B, it will be appreciated that the invention may be practiced in other embodiments.

The suppression 240 may be limited to a period of time. In alternative embodiments, the suppression 240 is not limited to a period of time but instead ends in response to some external event; e.g. the network element 205 may receive a message indicating that the suppression 240 should be terminated. In still another embodiment, the suppression 240 may be limited to a period of time but may also be ended responsive to some external event, such as the network element 205 receiving a message that the suppression 240 should be ended. In embodiments where the suppression 240 is limited to a period of time, the suppression 240 is said to be temporary. In embodiments where the suppression 240 is not limited to a period of time, the suppression is not necessarily temporary because it only ends responsive to an external event. In this sense, the suppression 240 is at least temporary, in so much as that it may last for a set period of time, may last for an undetermined period of time, or may not end at all.

For example, in one embodiment, a temporary suppression is associated with an access-reset timer. Responsive to the temporary suppression being activated, a corresponding access-reset timer is started. Responsive to the access-reset timer running through a period of time, which may be specified in connection with the corresponding subscriber end station or may be set with respect to all subscriber end stations, the temporary suppression will be deactivated; the suppression 240 is said to be temporary. In another embodiment, the suppression is deactivated responsive to a change of authorization message indicating that suppression should be deactivated; the suppression 240 is not necessarily temporary but may end. Still a further embodiment utilizes a combination of access-reset timers and change of authorization messages so that the suppression 240 may be ended responsive to the completion of a corresponding access-reset timer but also may be ended responsive to the change of authorization message; the suppression 240 is temporary and may be ended prior to the time period ending.

The advantage of suppressing AAA access-request messages is a savings of execution resources, such as network bandwidth, central processing unit (CPU) resources, and/or storage resources, in the network element 205 and the AAA server 210. The network element 250 and the AAA server 210 conserve execution resources by limiting the amount of processing needed to respond to subscriber end station 'A' session-request messages 220G-220M.

Other methods of limiting the execution resources consumed by rejected subscriber end stations may introduce security vulnerabilities and/or allow the rejected subscriber end stations to consume more execution resources than is necessary. For example, one method is to accept the authentication request but only authorize the subscriber end station to access an isolated portion of the network. By authorizing the subscriber end station to an isolated portion of the network, the subscriber end station has limited or no access to the available services but will no longer make repeated requests for authentication as the subscriber end station's authentication request was not rejected. However, granting even limited access to the network has potential security implications. Furthermore, the subscriber end station may consume resources on the network element and on the access network even while isolated to a limited portion of the network. Therefore, suppressing additional AAA access-request messages is advantageous because it conserves more execution resource and does not open security vulnerabilities.

Figure 3A:
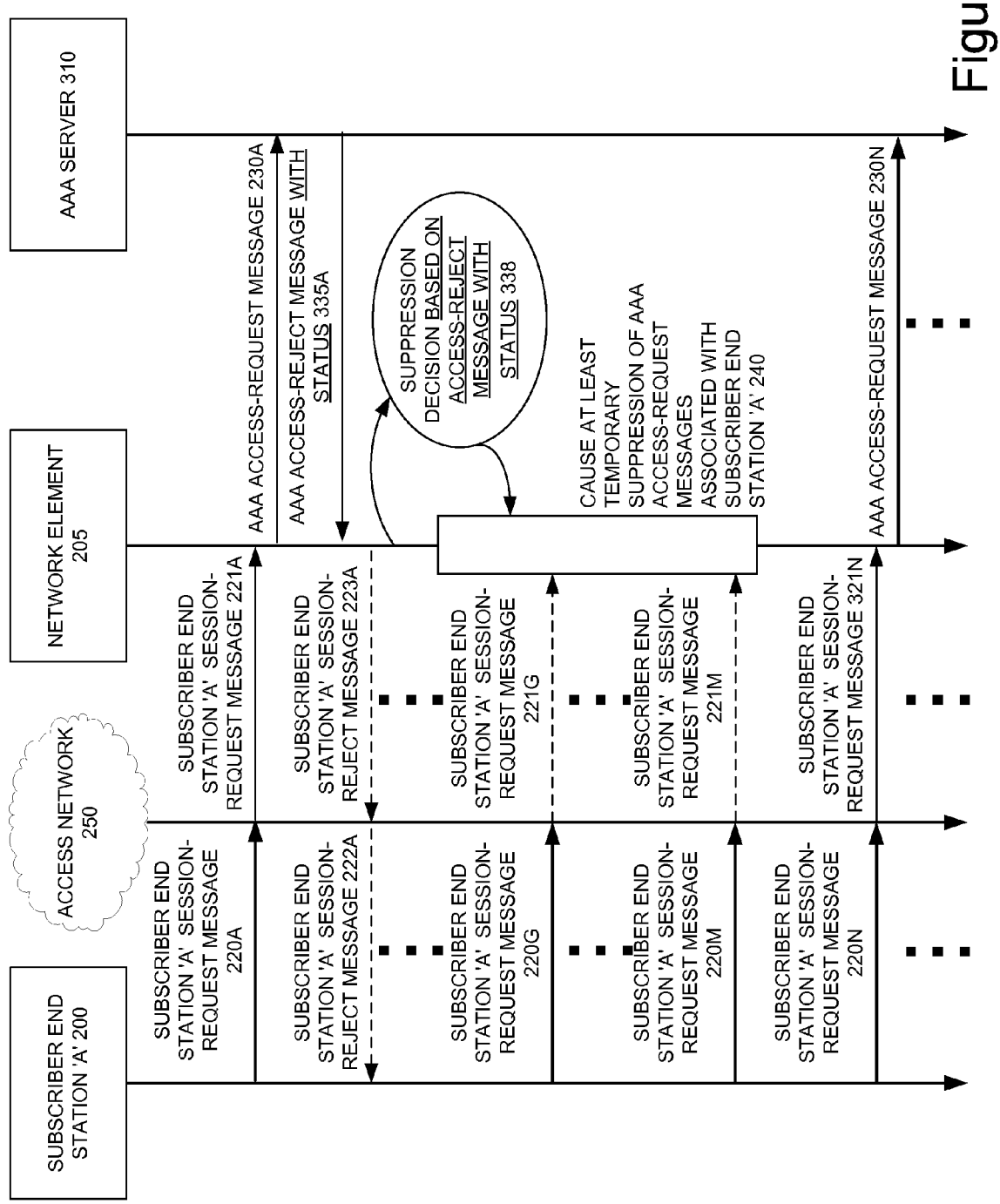
FIG. 3A illustrates a data flow diagram of a first embodiment of the invention at least temporarily suppressing additional AAA access-request messages for rejected subscriber end stations based on an access-reject message with a status indicating the temporary suppression.

FIG. 3A illustrates a data flow diagram of a first embodiment of the invention at least temporarily suppressing additional AAA access-request messages for rejected subscriber end stations based on an access-reject message with a status indicating the suppression. FIG. 3A is identical to FIG. 2, except the AAA access-reject message 235A has been replaced with an AAA access-reject message with status 335A and the suppression decision 238 has been replaced with a suppression decision based on access-rejection message with status 338. In FIG. 3A, the AAA server 310 has been configured to respond to the AAA access-request message 230A with an AAA access-reject message with status 335A. The AAA access-reject message with status 335A contains information indicating that the suppression of AAA access-request messages is warranted. Responsive to receiving the AAA access-reject message with status 335A, the network element 205 makes the suppression decision 338 based on the information contained within the access-reject message with status 335A. In some embodiments, the information contained within the access-reject message is a reason why the subscriber end station 'A' 200 has been rejected by the AAA server 310. In other embodiments, the information is merely a flag indicating that the suppression is warranted.

Figure 3B:
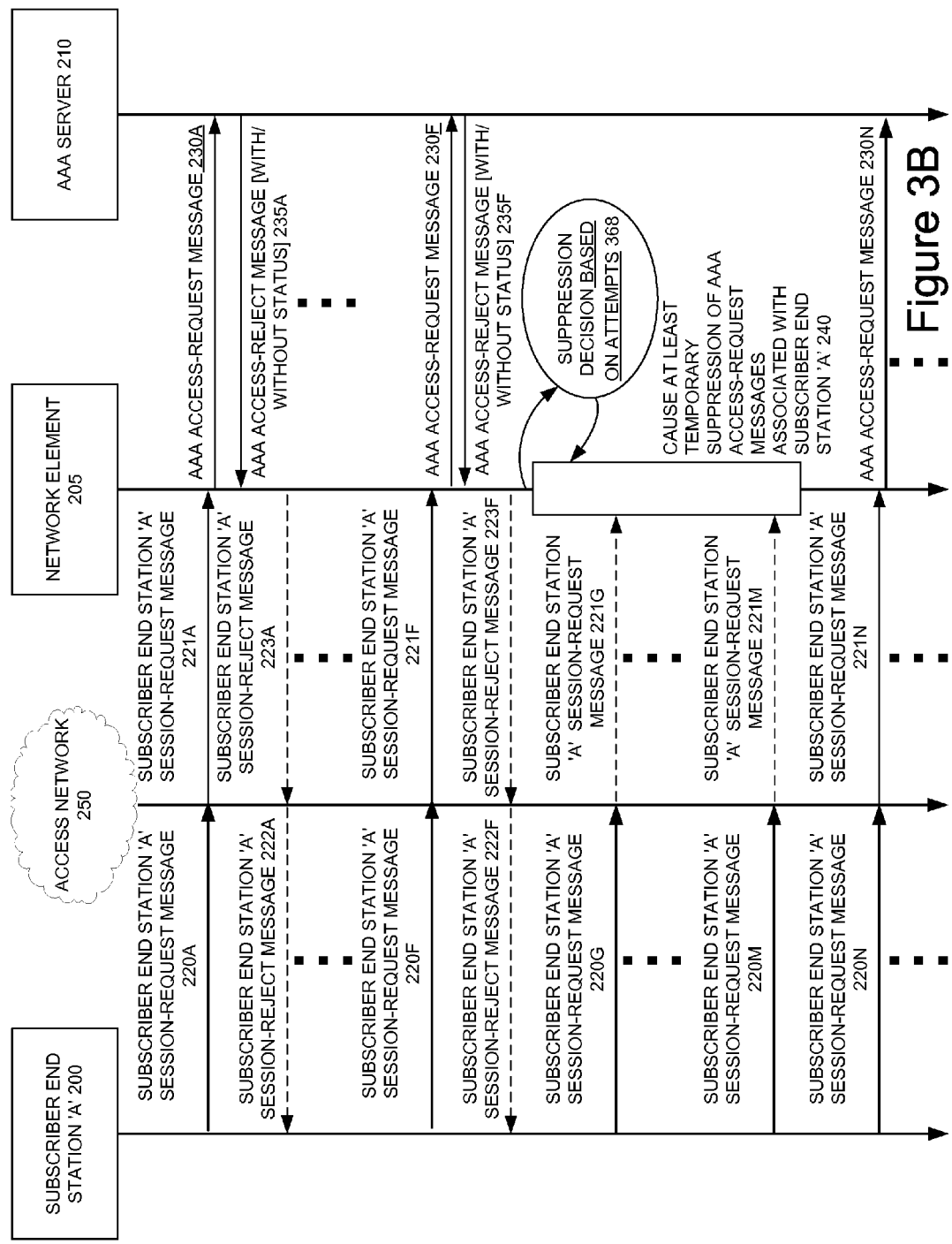
FIG. 3B illustrates a data flow diagram of a second embodiment of the invention temporarily suppressing additional AAA access-request messages for rejected subscriber end stations based on the number of AAA access attempts.

FIG. 3B illustrates a data flow diagram of a second embodiment of the invention at least temporarily suppressing additional AAA access-request messages for rejected subscriber end stations based on the number of AAA access attempts. FIG. 3B is identical to FIG. 2, except: 1) the subscriber end station 'A' session-request messages 220B-F/221B-F result in the network element 205 sending AAA access-request messages 230B-F to the AAA server 210 and receiving there from responsive AAA access-reject messages [with/without status] 235B-F—this is because the suppression is not initiated until after the AAA access-reject message 235F; and 2) the suppression decision 238 is replaced with a suppression decision based on attempts 368.

Specifically, the subscriber end station 'A' 200 attempts to initiate a session with network element 205 in similar manner as described with reference to FIG. 2. The subscriber end station 'A' session-request message 220A is sent and processed by the network element 205 and the AAA server 210 in a similar manner as described with reference to FIG. 2. However, in this case the network element 205 tracks the number of repeated subscriber end station 'A' session-request messages 221A-221F that the subscriber end station 'A' has unsuccessfully made. Responsive to reaching some threshold number of attempts (illustrated as six in the FIG. 3B, however not limited to any specific number in the invention), the network element 205 makes a suppression decision based on the number of attempts 368. The network element 205 then causes the suppression of AAA access-request messages associated with subscriber end station 'A' 240 in a similar manner as described with reference to FIG. 2. While in one embodiment the suppression decision 368 is based on the number of attempts, alternative embodiments may use other criteria (e.g., the number of attempts within a rolling window of time).

Figure 4A:
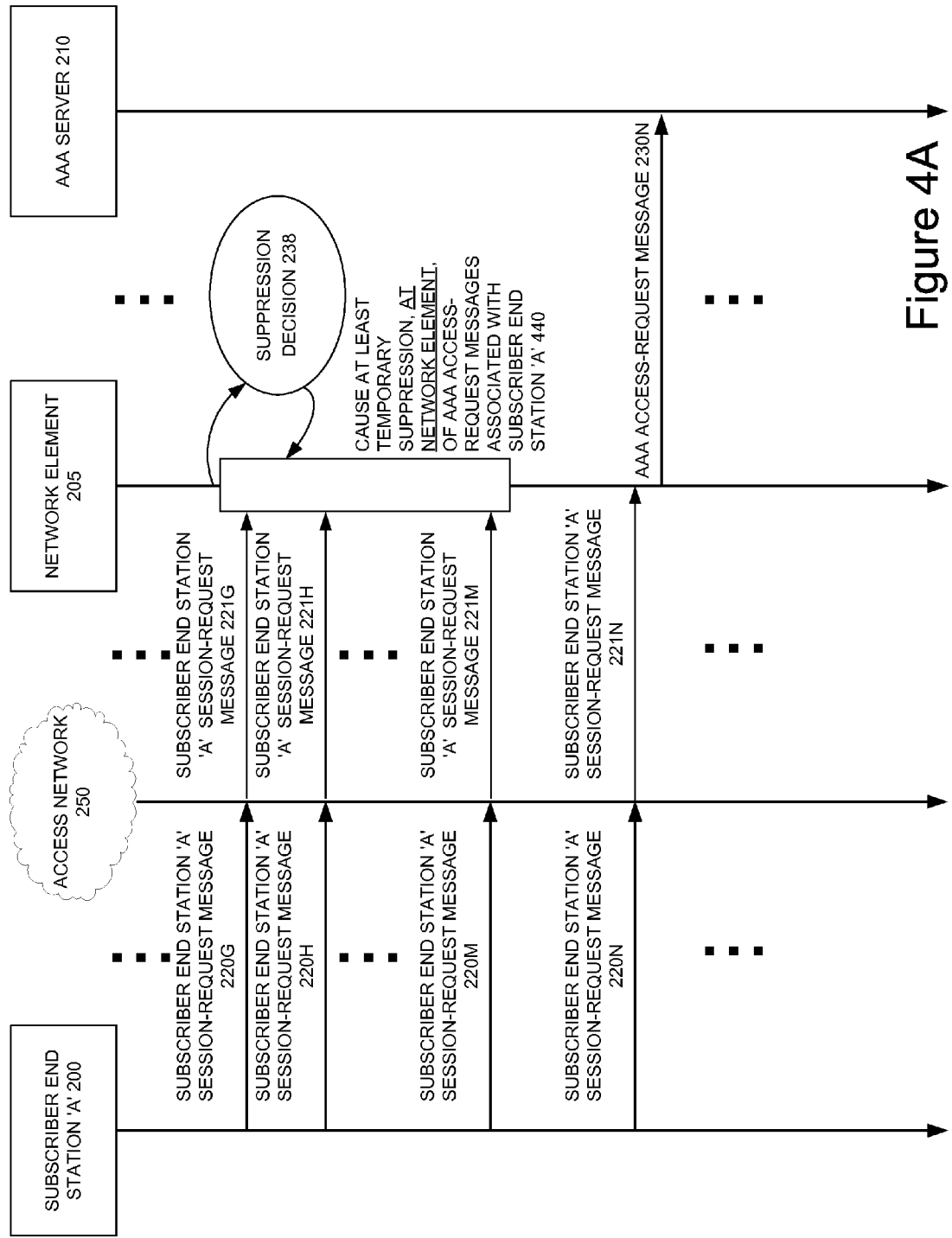
FIG. 4A illustrates a data flow diagram of a third embodiment of the invention at least temporarily suppressing, at a network element, additional AAA access-request messages for rejected subscriber end stations.

FIG. 4A illustrates a data flow diagram of a third embodiment of the invention at least temporarily suppressing, at a network element, additional AAA access-request messages for rejected subscriber end stations. Like in FIG. 2, along the top of FIG. 4A the subscriber end station 'A' 200, the access network 250, the network element 205, and the AAA server 210 are each illustrated with a vertical line indicating the progression of time. The transmissions of various messages are illustrated chronologically down as horizontal arrows between the vertical lines, and messages that are optional based upon the specific implementation are shown with dashed arrows.

FIG. 4A begins with the suppression decision 238 from FIG. 2, rather than with the messages 220A, 221A, 230A, and 235A. In addition, in FIG. 4A the subscriber end station 'A' session-request messages 221G-M are solid lines (as opposed to dashed as in FIG. 2) to indicate those messages are received by the network element 205. Furthermore, the suppression 240 of FIG. 2 is replaced with the causing of an at least temporary suppression, at the network element 205, of AAA access-request messages associated with the subscriber end station 'A' 440. Thus, the focus in FIG. 4A is that suppression of additional AAA access-request message occurs at a network element 205.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

With reference to FIG. 4A, once the suppression decision 238 occurs—as described with reference to FIG. 2—the network element 205 causes the suppression of additional AAA access-request messages associated with subscriber end station 'A' 440 at the network element 205. Here, the network element 205 continues to receive additional subscriber end stations 'A' session-request messages 221G-M, but does not transmit a corresponding AAA access-request message to the AAA server 210. While in one embodiment of the invention, network element 205 filters session-request messages based on an identifier associated with subscriber end station 'A' 200 contained within the session-request message, based on a MAC address associated with subscriber end station 'A' 200, or based on a circuit identifier associated with subscriber-end station 'A' 200, alternative embodiments may use more, less, or different identifiers. Upon the termination of the suppression, the network element 205 will stop filtering subscriber end station 'A' session-request messages and will once again transmit corresponding AAA access-request messages associated with subscriber end station 'A' 200 to the AAA server 210.

Figure 4B:
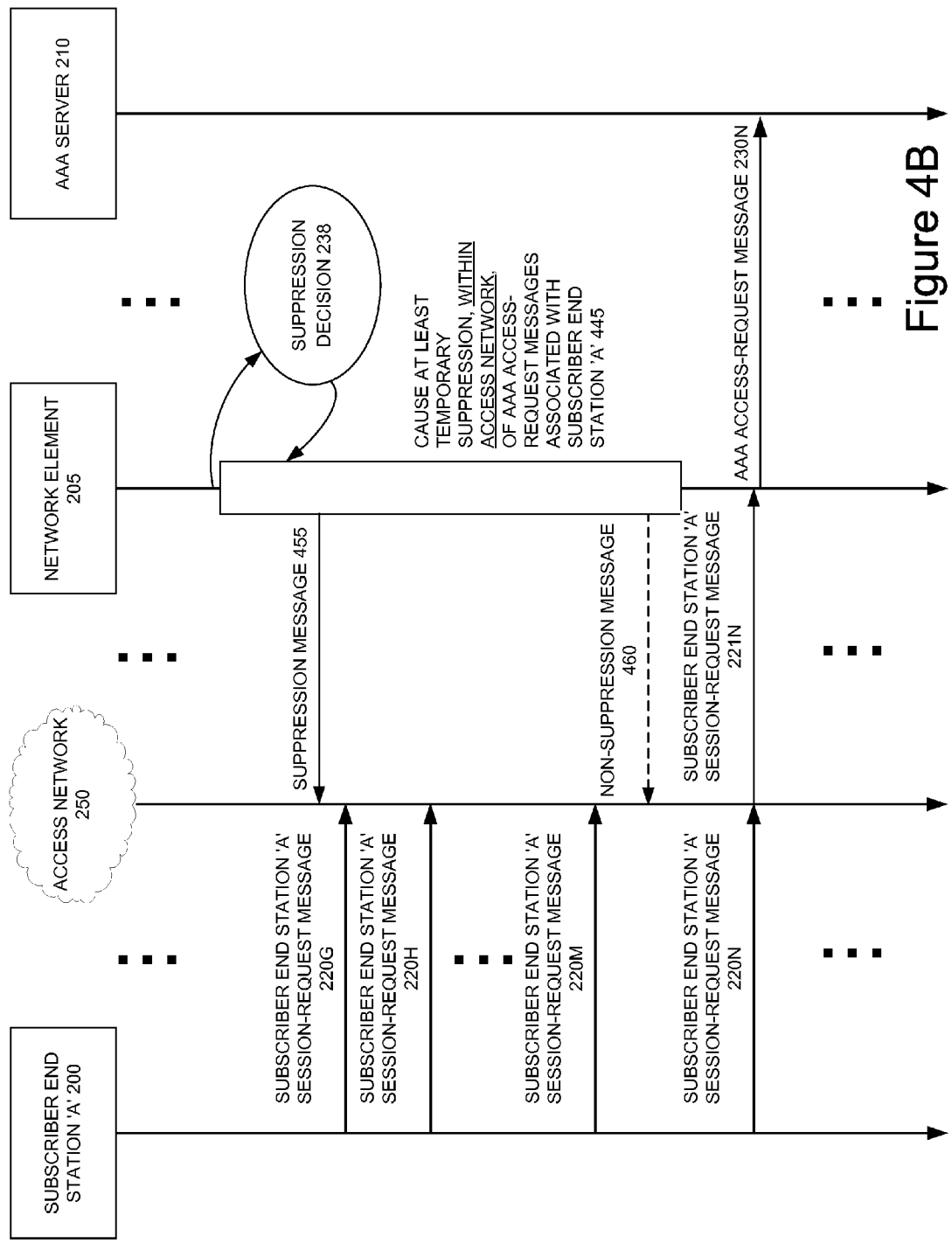
FIG. 4B illustrates a data flow diagram of a fourth embodiment of the invention at least temporarily suppressing, within an access network, additional session-request messages for rejected subscriber end stations.

FIG. 4B illustrates a data flow diagram of a fourth embodiment of the invention at least temporarily suppressing, within an access network, additional session-request messages for rejected subscriber end stations. FIG. 4B is identical to FIG. 4A except: 1) the causing the suppression 440 has been replaced with causing of an at least temporary suppression, within the access network 250, of AAA access-request messages associated with the subscriber end station 'A' 445; 2) a suppression message 455 has been added to the start of the suppression 445 from the network element 205 to the access network 250; 3) the subscriber end station 'A' session-request messages 221G-221M have been removed and 4) a non-suppression message 460 has been added to the end of the suppression 445 from the network element 205 to the access network 250. The focus in FIG. 4B is that suppression of additional AAA access-request messages includes the suppression of additional session-request messages from reaching the network element 205.

Once the suppression decision 238 occurs—as described with reference to FIG. 2—the network element 205 causes the suppression of additional session-request messages 445 associated with subscriber end station 'A' 200 at the access network 250. In this case, the network element 205 transmits a suppression message 455 to the access network 250 that identifies the subscriber end station 'A' 200 by some unique value.

In one embodiment of the invention, network element 205 identifies subscriber end station 'A' 200 based on a MAC address or based on a circuit identifier. The suppression message 455 conveys enough information that the access network is able to prevent additional subscriber end station 'A' session-request messages 220G-220M from reaching the network element 205. Thus, execution resources at network element 205 are further conserved because there is no processing required in the network element 205 for additional subscriber end station 'A' session-request messages 221G-221M. Upon the termination of the suppression, the network element 205 will transmit a non-suppression message 460 to access network 250 identifying that subscriber end station 'A' should no longer be suppressed. While in one embodiment, the suppression message and non-suppression messages are operations, administration, maintenance, and provisioning (OAMP) messages indicating a circuit down and circuit up respectively, alternative embodiments may use other types of messages such as fault, configuration, accounting, performance, security (FCAPS) messages.

After the access network 250 received the non-suppression message 460, the access network 250 will transmit subscriber end station 'A' session-request message 221N to the network element 205 in response to receiving subscriber end station 'A' session-request message 220N. The network element 205 will transmit a corresponding AAA access-request message 230N to the AAA server 210. It should be noted that the embodiments shown in FIGS. 3A and 3B may be used with either of the embodiments shown in FIGS. 4A and 4B.

Figure 5:
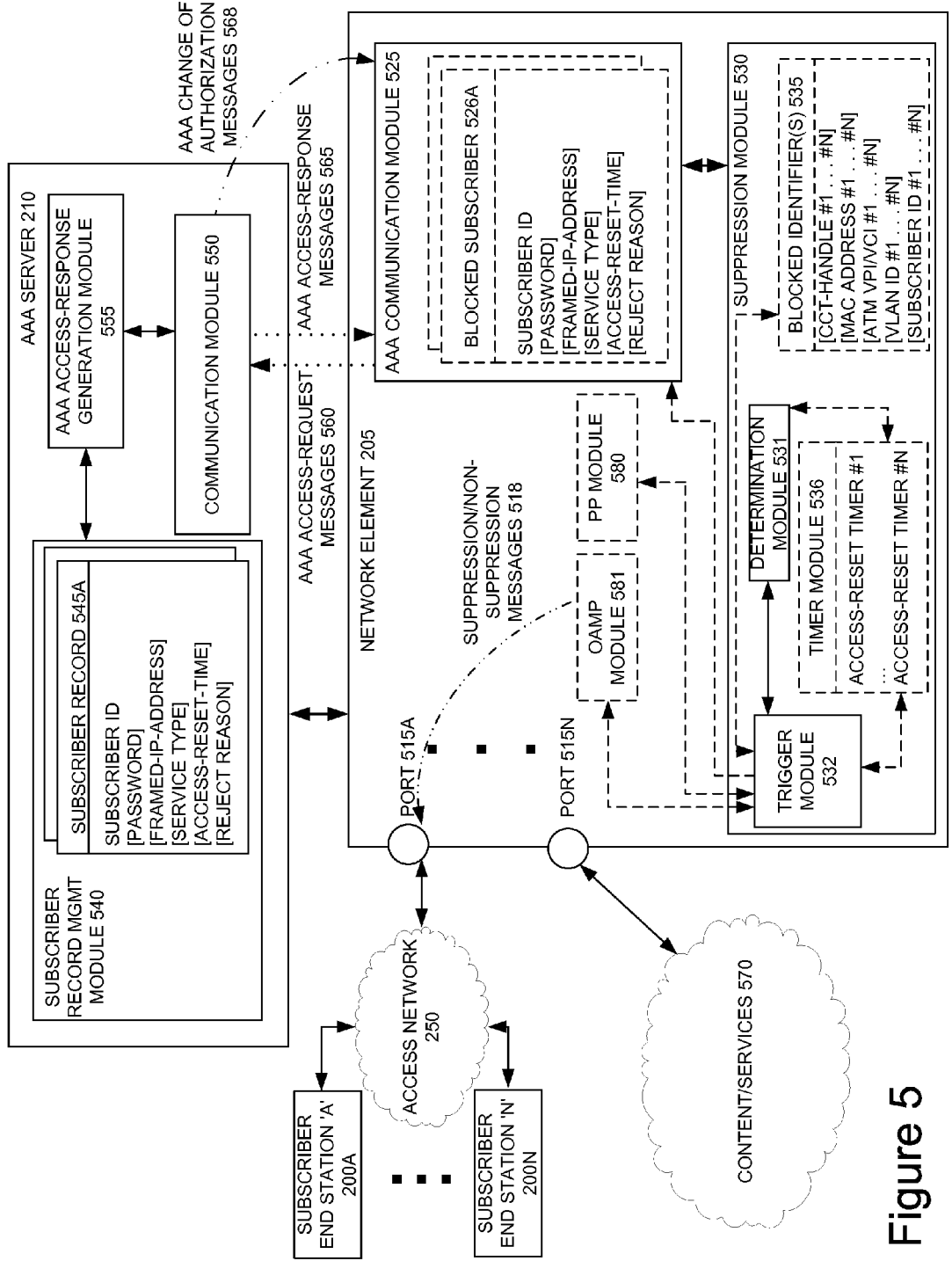
FIG. 5 is a block diagram illustrating a system including a network element, an AAA server, and an access network in which AAA access-reject messages are at least temporarily suppressed for rejected subscriber end stations according to embodiments of the invention.

FIG. 5 is a block diagram illustrating a system including a network element, an AAA server, and an access network in which AAA access-reject messages are at least temporarily suppressed for rejected subscriber end stations according to embodiments of the invention. The system illustrated operates in a manner as described in the previous FIGS. 2-4B. This figure includes messages, modules, and couplings that are optional depending on the specific implementation. As such, modules that are optional are shown in dashed boxes and are coupled to other modules with dashed arrows. Optional messages are shown in dashed-dotted arrows while required messages are shown in dotted arrows. Furthermore, optional fields in data records are shown in brackets while required fields are shown without brackets.

In FIG. 5, subscriber end stations 200A-200N are coupled to port 515A in a network element 205 through an access network 250. The network element 205 is further coupled to content/services 570 through port 515N and to the AAA server 210.

The network element 205 comprises at least an AAA communication module 525 coupled with a suppression module 530. The AAA communication module 525 is in communication with the AAA server 210. The AAA communication module 525 at least transmits and receives AAA access-request messages 560 and AAA access-response message 565 respectively. In some embodiments of the invention, the AAA communication module 525 also receives AAA change of authorization messages 568 that indicate the non-suppression of an associated subscriber end station.

The suppression module 530 makes the suppression decision 238 and causes the suppression of additional AAA access-request messages associated with subscriber end station 'A' 240. Specifically, the suppression module comprises a determination module 531 that is capable of making the suppression decision as described with reference to FIG. 2 (e.g., in the manner described in FIG. 3A and/or 3B), and the suppression module further comprises a trigger module 532 that causes the suppression as described with reference to FIG. 2 (e.g., in the manner described in FIGS. 4A and 4B).

In those embodiments that utilize access-reset times, the suppression module further comprises a timer module 536 coupled with determination module 531 and trigger module 532. The timer module 536 maintains a plurality of access-reset times 536#1-536#N. Each timer corresponds to one or more currently suppressed subscriber end stations. When the determination module 531 makes a suppression decision 238, a corresponding access-reset timer is started in the timer module 536. While in one embodiment of the invention this timer is set to run for a period of time either based on a global value or based on an associated subscriber (this value may be stored in a blocked subscriber record 526A), it may be set in more, less, or different ways in alternative embodiments (e.g., a value configured for each port, a value configured for each virtual router, etc.). After the access-reset timer runs for the allotted period of time, the trigger module will deactivate the temporary suppression.

In at least some embodiments, the suppression module maintains a list of blocked identifiers 535. The list of blocked identifiers 535 includes a list of identifiers each associated with a subscriber end station or a subscriber for which a suppression of AAA access-request messages is activated. While in one embodiment of the invention the list of blocked identifiers 535 may include a list of circuit handles (CCT-Handles) and a list of MAC addresses, alternative embodiment may use more, less, or different identifiers (e.g., a list of ATM VPIs/VCIs, VLAN IDs, and/or a list of subscriber identifiers). The trigger module 532 would add an identifier associated with a subscriber end station to the list of blocked identifiers 535 responsive the activation of a suppression of that subscriber end station. In response to the deactivation of a suppression, the trigger module would remove an identifier from the list of blocked identifiers 535; the identifier associated the subscriber end station or subscriber for which suppression was deactivated.

It is possible for the trigger module 532, to activate/deactivate a suppression of AAA access-request messages in a number of manners. Some of these manners are described with reference to FIGS. 4A and 4B.

For instance, in embodiments implementing the suppression at the network element, as shown in FIG. 4A, the network element may include a packet processing module 580. The trigger module 532 would communicate an identifier associated with a suppressed subscriber end station to the packet processing module 580 responsive to a suppression decision 238. The packet processing module 580 would be capable of identifying incoming session-request messages associated a blocked subscriber end station or subscriber and drop the session-request such that an AAA access-request message would not be sent.

In another embodiment with reference to FIG. 4A, the trigger module 532 may indicate to the AAA communication module 525 that additional AAA access-request messages should not be transmitted with respect to session-request messages associated with blocked subscriber end stations or subscribers. In this case, AAA communication module would not send any AAA access-request messages to the AAA server 210 in response to receiving a session-request message from a blocked subscriber end station or subscriber.

Another manner of causing the suppression of additional AAA access-request messages is performed in the access network 250 as described in FIG. 4B. In this embodiment, the trigger module 532 communicates with an OAMP module 581 to indicate the activation/deactivation of a suppression of additional AAA access-request messages. The OAMP module 581 transmits a corresponding suppression/non-suppression message to the access network 250. In response the suppression/non-suppression message, the access network will either block or forward session-request messages from an associated subscriber end station. In this case, the suppression suppresses not only AAA access-request messages but also suppresses session-request messages from reaching the network element 205. In at least some embodiments, the suppression/non-suppression message is a channel down/channel up OAMP message indicating that the access network 250 should shut down/bring up a network circuit associated with subscriber end station. The advantage of this method is that the network element 205 does not use execution resources to respond to additional session-request messages that will not have a corresponding AAA access-request message because of the suppression.

In FIG. 5, the AAA server 210 is for authenticating each subscriber is response to an AAA access-request message. The AAA server 210 comprises a communication module 550, an AAA access-response generation module 555, and a subscriber record management module 540. The subscriber record management module 540 maintains a list of subscriber records 545.

The communication module 550 is responsible for transmitting and receiving messages to and from the AAA communication module 525 in the network element 205. The AAA access-response generation module 555 builds an appropriate AAA access-response message 565 to an AAA access-request message 560. In at least some cases this message will be an AAA access-reject message with or without status information suggesting a suppression of additional AAA access-request messages associated with a corresponding subscriber end station or subscriber.

A subscriber record 545A includes information associated with each subscriber. A subscriber record 545A comprises at least a subscriber identifier that uniquely identifies the corresponding subscriber; such as a username. While in one embodiment of the invention a subscriber identifier is a unique integer associated with a subscriber, in alternative embodiments the subscriber identifier may be different (e.g., the MAC address associated with a corresponding subscriber end station). In one embedment of the invention the subscriber record 545A also includes, a password, a framed IP address, a service type, information identifying an access-reset-timer, and/or a reject message-reason (each shown in brackets in FIG. 5).

In some embodiments of the invention, information from the subscriber record 545A is transmitted to the AAA communication module 525 in the AAA access-response messages 565. In those embodiments, the AAA access-response generation module builds an appropriate AAA access-response message 565 that includes information from the subscriber record 545A. Information contained in the subscriber record 545A is used by the suppression module to cause the suppression of AAA access-request messages 240 as described in to FIG. 2 (e.g., in the manner described in FIGS. 4A and 4B). In one embodiment, the AAA communication module 525 further comprises a list of blocked subscriber records 526 that is populated with subscriber information received within the AAA access-response messages 565. In alternative embodiments, the subscriber information is populated into the list of blocked identifiers 535 in the suppression module 530.

In embodiments making use of access-reset timers described above, the subscriber records 545 can further include information identifying a specific access-reset timer or a length of time for which to run an access-reset timer for each subscriber responsive to a temporary suppression. This information would be used to select the correct timer or set the correct timer value in the timer module 536.

Further, in one embodiment of the invention, the trigger module 532 supports multiple manners of suppression, such as described with reference to FIGS. 4A and 4B. In this embodiment, the trigger module 532 can use the service type field to determine which of the available manners of suppression should be used for a particular subscriber end station 200A-200N. For example, the service type might indicate that a subscriber end station 200A-200N is coupled to the network element 205 via a broadcast channel, and therefore, the trigger module 532 would use the manner described with reference to FIG. 4A. Alternatively, the service type might indicate that a subscriber end station 200A-200N coupled to the network element 205 via a circuit based channel and, therefore, the trigger module 532 would use the manner described with reference to FIG. 4B to cause the suppression 445.

With reference to FIGS. 4A and 4B, the suppression module causes the suppression 440 or 445 and uses information populated from the subscriber record 545A to identify subscriber end station session-request messages for which AAA access-request messages should be suppressed. In one embodiment of the invention, the suppression module utilizes a subscriber identifier to determine a blocked identifier used to suppress subscriber end stations, while another embodiment utilizes a framed IP address. In one embodiment the blocked identifier is a CCT-Handle, while in alternative embodiments the blocked identifier can be another identifier (e.g., MAC address, ATM VPI/VCI, VLAN ID, subscriber id).

In one embodiment, the subscriber records 545 include a reject reason indicating why the subscriber should be suppressed. For instance, the reject reason may indicate insufficient payment, violation of acceptable use policies, and/or a compromised subscriber end station. All of these reasons may suggest that additional access-request messages should be suppressed for an associated subscriber end station or subscriber. In one embodiment of the invention, the reject reason is transmitted to the AAA communication module in the AAA access-response messages 565. With reference to FIG. 3A, the reject reason is included in the AAA access-reject message with status 335A and is used by the determination module 531 to make the suppression decision 338.

In some embodiments, the communication module 550 is configured to send AAA change of authorization messages 568 in response to a subscriber record 545A being updated by the subscriber record management module 540. Specifically, in cases that a subscriber record 545A has a reject reason indicating insufficient payment, the subscriber record management module 540 may clear the reject reason after receiving an indication that sufficient payment was made. In that case, the communication module 550 may send an AAA change of authorization message 568 to the AAA communication module 525 indicating that suppression of the corresponding subscriber end station is no longer warranted.

Figure 6:
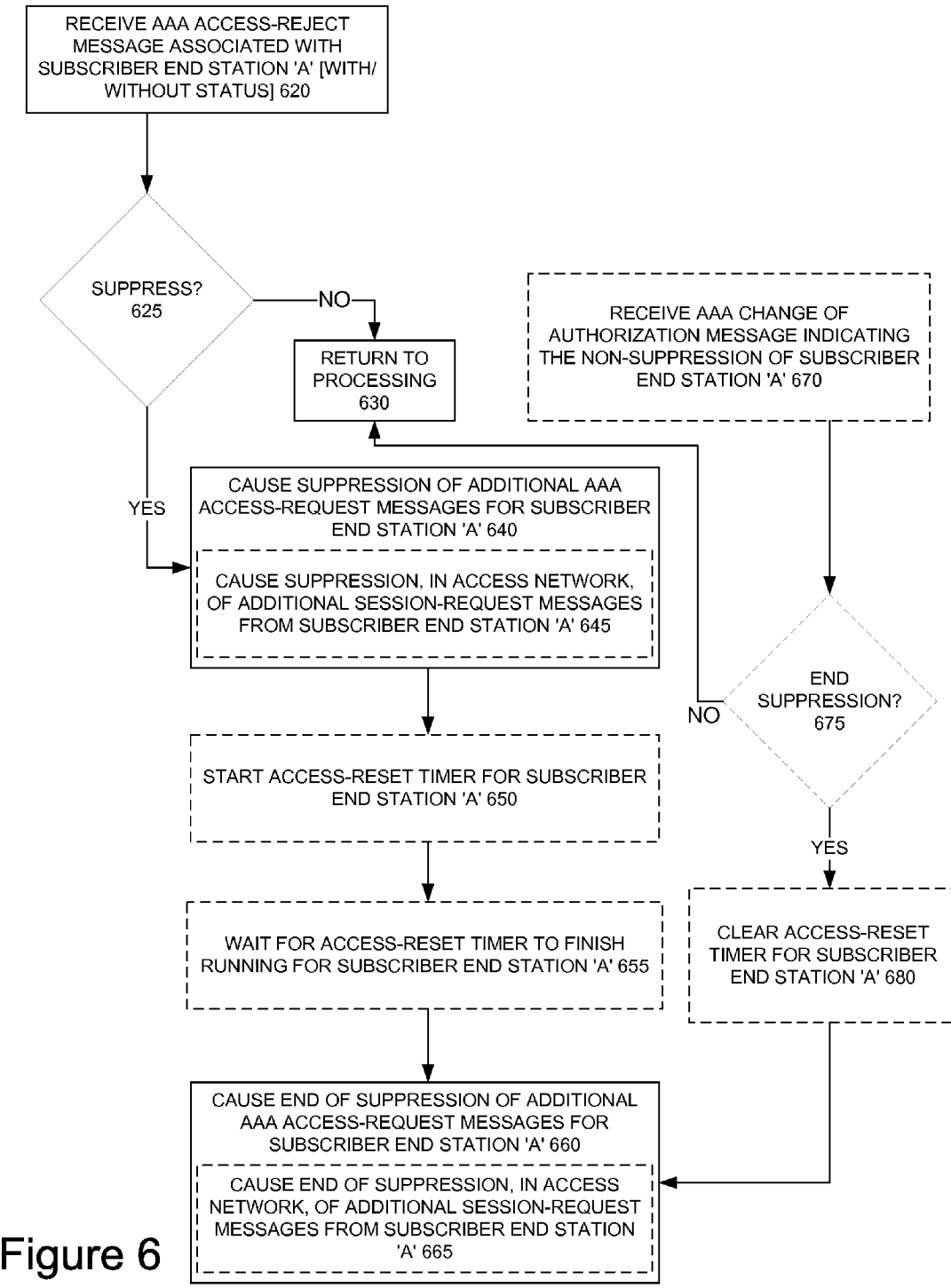
FIG. 6 illustrates a flow chart of a method of the invention for at least temporarily suppressing additional AAA access-request messages for rejected subscriber end stations according to embodiments of the invention.

FIG. 6 illustrates a flow chart of a method of the invention for at least temporarily suppressing additional AAA access-request messages for rejected subscriber end stations. Many steps in the method are optional depending on the implementation of the invention and those steps are shown with dashed markings.

At some point in processing, the network element 205 receives an AAA access-reject message associated with subscriber end station 'A' with or without status information indicating a reject reason 620. In response, the network element 205 makes a decision whether or not to cause a suppression of additional AAA access-request messages 625. If the network element 205 decides not to cause the suppression, then the network element continues on to processing 630.

In the case that the network element 205 decides to cause the suppression of additional AAA access-request messages, then the network element causes the suppression for subscriber end station 'A' 640 (this may be within the network element 205 as described with reference to FIG. 4A, or may be within the access network as described with referenced to FIG. 4B—and thus cause the suppression of additional session-request messages being received by the network element 205 as well). In those embodiments including access-reset timers, the network element will start an access-reset time for subscriber end station 'A' 650 in response to deciding the suppression decision.

At some point later, network element 205 will cause the end of the suppression of additional AAA access-request messages for subscriber end station 'A' 660. The network element 205 will also end the suppression of additional session-request messages 665 in cases which also caused the suppression of receipt of session-request messages. In those embodiments that utilized access-reset timers, the causing the end of suppression 660 may be performed responsive to the completion of the access-reset timer running that is associated with subscriber end station 'A' 650.

Furthermore, it may be that the network element 205 receives an AAA change of authorization message indicating non-suppression of subscriber end station 'A' 670. In response to the AAA change of authorization message, the network element 205 must decide whether it should end suppression 675. If suppression does not need to be ended, either because there is no suppression or because other factors indicate that suppression should continue in lieu of the message, then the network element 205 will continue processing 630. If suppression should be ended then the network element 205 will cause the end of the suppression 660 as described above. In the embodiment utilizing access-reset timers, the network element 205 may further clear the access-reset timer associated with subscriber end station 'A' 680 in response to the decision to end suppression 675.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method performed in a network element for avoiding authentication, authorization, and accounting (AAA) processing, wherein the network element is coupled between a subscriber end station and an AAA server, the method comprising the steps of:
   receiving from the subscriber end station one or more subscriber session-request messages including at least information for verifying identity;
   transmitting to the AAA server one or more AAA access-request messages corresponding to the one or more subscriber session-request messages;
   receiving from the AAA server one or more AAA access-response messages corresponding to the one or more AAA access-request messages;
   determining, responsive to the one or more AAA access-response messages, to cause at least a temporary suppression of any additional AAA access-request messages associated with the subscriber end station; and
   starting an access-reset timer in response to the step of determining, wherein the access-reset timer is associated with the subscriber end station and the access-reset timer measures a time interval;
   causing, responsive to completion of the time interval, the ending of the at least temporary suppression; and
   causing, responsive to the step of determining, at least a temporary suppression of any additional AAA access-requests messages being sent to the AAA server responsive to subscriber session-request messages received from the subscriber end station, wherein the step of causing includes transmitting an operations, administration, maintenance, and provisioning message toward the subscriber end station indicating to shut down a circuit associated with the subscriber end station, whereby execution resources are preserved at the network element and the AAA server.

2. The method of claim 1, further comprising the steps of:
   receiving an AAA change of authorization message, associated with the subscriber end station, from the AAA server that indicates a status suggesting that the at least temporary suppression should end;
   causing, responsive to the AAA change of authorization message, the ending of the at least temporary suppression.

3. The method of claim 1, further comprising the steps of:
   receiving one or more additional session-request messages associated with the subscriber end station;
   dropping the one or more additional session-request messages without transmitting any corresponding AAA access-request messages pursuant to the temporary suppression, wherein dropping is done based on a media access control address associated with the subscriber end station.

4. The method of claim 1, wherein the step of determining to cause the at least temporary suppression is responsive to receiving a single one of the corresponding one or more AAA access-response messages that is an AAA access-reject message with a status suggesting the at least temporary suppression.

5. The method of claim 1, wherein the corresponding one or more AAA access-response messages is a single AAA access-reject message, and wherein the step of determining includes the step of: determining that the AAA access-reject message includes a status suggesting the at least temporary suppression.

6. The method of claim 5, wherein the step of causing comprise the step of:
   causing any additional AAA access-request messages associated with the subscriber end station to be dropped based on a media access control address associated with the subscriber end station.

7. A network element, to be coupled between a plurality of subscriber end stations and an authentication, authorization, and accounting (AAA) server, to avoid AAA processing, the network element comprising:
   a set of one or more ports to be coupled to the plurality of subscriber end stations;
   an AAA communication module, to be coupled to the AAA server, configured to receive subscriber session-request messages sent from the plurality of subscriber end stations, to transmit corresponding AAA access-request messages to the AAA server, and to receive corresponding AAA access-response messages of different types, wherein the different types of AAA response messages include AAA access-reject messages; and
   a suppression module, coupled to the AAA communication module, including:
      a determination module configured to determine when to activate a suppression of AAA access-request messages associated with any one of the plurality of subscriber end stations, and
      a timer module, coupled to the determination module, configured to:
         maintain a set of one or more access-reset timers, to measure time intervals for at least some of the suppressions; and
         cause the deactivation of the suppressions responsive to completion of the corresponding time intervals;
      a trigger module, coupled to the determination module, configured to cause the suppressions when the suppressions are activated, whereby execution resources are preserved at the network element and the AAA server;

an operations, administration, maintenance, and provisioning module, coupled to the trigger module, to transmit pursuant to the trigger module suppression messages to an access network coupled between the plurality of subscriber end stations and the network element, the suppression messages to indicate to shut down a circuit associated with one of the identified ones of the plurality the subscriber end station.

8. The network element of claim 7, wherein the AAA communication module is further configured to:
receive AAA change of authorization messages, each of the AAA change of authorization messages associated with a corresponding one of the plurality of subscriber end stations, that each indicate a status suggesting the corresponding suppression should be deactivated; and cause the deactivation of the corresponding suppressions.

9. The network element of claim 7, wherein the trigger module further is to cause the suppressions of identified ones of the of the plurality of subscriber end stations through suppressions of subscriber session-request messages associated with those identified ones of the of the plurality of subscriber end stations.

10. The network element of claim 9, further comprising:
a packet processing module, coupled to the trigger module, to drop pursuant to the trigger module additional session-request messages from the identified ones of the plurality of subscriber end stations such that the AAA communications module does not transmit any corresponding AAA access-request messages, each additional session-request message to be determined by a media access control address corresponding to one of the identified ones of the plurality of subscriber end stations.

11. A method performed in an authentication, authorization, and accounting (AAA) server for avoiding AAA processing in the AAA server and in an edge network element, wherein a subscriber end station and the AAA server are coupled to the edge network element, the method comprising the steps of:
receiving from the edge network element an AAA access-request message including at least information for verifying identity;
accessing a subscriber record corresponding to the subscriber end station based on the information for verifying identity, wherein the subscriber record includes information regarding a subscriber's account associated with the subscriber end station, wherein the subscriber record includes information indicating that the subscriber's account is unpaid;
transmitting, responsive to the AAA access-request message, an AAA access-response message that is an AAA access-reject message including a status based on the subscriber's account suggesting at least a temporary suppression of any additional AAA access-request messages associated with at least the subscriber end station, whereby execution resources are preserved at the network element and the AAA server;
updating the subscriber record to modify a value contained in a reject reason field; and
transmitting, responsive to the updating, an AAA change of authorization message indicating a status suggesting the ending of the at least temporary suppression.

12. The method of claim 11, wherein the AAA access-reject message includes a field for transmitting the status.

13. An authentication, authorization, and accounting (AAA) server, to be coupled to an edge network element, for avoiding AAA processing in the AAA server and the edge network element, wherein the edge network element is coupled to a plurality of subscriber end stations, the AAA server comprising:
a communication module to receive AAA access-request messages from the edge network element for different ones of the plurality of subscriber end stations and to transmit corresponding AAA access-response messages to the edge network element;
a subscriber record management module, coupled to the communication module, configured to store a plurality of subscriber records and to access a corresponding one of the subscriber records responsive to each of the AAA access-request messages, wherein each of the subscriber records includes account information relating to a corresponding subscriber;
an AAA access-response generation module, coupled to the subscriber record management module and the communication module, configured to generate AAA access-response messages of an AAA access-reject type when the account information of the currently accessed one of the subscriber records indicates that the account is unpaid, wherein the AAA access-response messages of the AAA access-reject type indicate to the network element at least a temporary suppression of any additional AAA access-request messages associated with that subscriber record, whereby execution resources are preserved at the network element and the AAA server;
the subscriber record management module further configured to update the account information of any of the plurality of subscriber records; and
the communication module further configured to transmit, responsive to each of the updates that clears the reason for one of the at least temporary suppressions, to the edge network element an AAA change of authorization message that is based on the updated subscriber record and that suggests the ending of the corresponding at least temporary suppression.

14. The AAA server of claim 13, wherein the AAA access-response generation module is also configured to generate AAA access-response messages of the AAA access-reject type when the account information of the currently accessed one of the subscriber records indicates a violation of acceptable use policies.

15. The AAA server of claim 13, wherein the AAA access-response generation module is also configured to generate AAA access-response messages of the AAA access-reject type when the account information of the currently accessed one of the subscriber records indicates the corresponding subscriber has cancelled service.

* * * * *